(12) United States Patent
Dabell et al.

(10) Patent No.: US 10,904,323 B2
(45) Date of Patent: Jan. 26, 2021

(54) METHODS FOR SERVER LOAD BALANCING IN A CLOUD ENVIRONMENT USING DYNAMIC CLOUD PRICING AND DEVICES THEREOF

(71) Applicant: F5 Networks, Inc., Seattle, WA (US)

(72) Inventors: Steve Dabell, Liberty Lake, WA (US); Timothy Scott Michels, Liberty Lake, WA (US); Thomas Troksa, Liberty Lake, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 16/004,279

(22) Filed: Jun. 8, 2018

(65) Prior Publication Data
US 2018/0359312 A1 Dec. 13, 2018

Related U.S. Application Data

(60) Provisional application No. 62/517,030, filed on Jun. 8, 2017.

(51) Int. Cl.
*H04L 12/26* (2006.01)
*H04L 29/08* (2006.01)

(52) U.S. Cl.
CPC .......... *H04L 67/1023* (2013.01); *H04L 43/08* (2013.01); *H04L 67/101* (2013.01)

(58) Field of Classification Search
CPC .......... G06F 9/50; G06F 9/5011; G06F 13/00; G06F 15/173; H04L 12/24; H04L 12/26; H04L 12/2602; H04L 12/5695; H04L 29/06; H04L 29/08; H04L 29/08072; H04L 29/08144; H04L 29/08171; H04L 41/12; H04L 41/22; H04L 41/0816; H04L 41/0893; H04L 41/0896; H04L 41/5025; H04L 41/5096; H04L 43/00; H04L 43/08; H04L 47/10; H04L 47/20; H04L 47/2408; H04L 47/2425; H04L 47/2575; H04L 67/101; H04L 67/288; H04L 67/289; H04L 67/1023; H04L 67/2842; H04L 67/2885; H04L 67/2895

(Continued)

(56) References Cited

U.S. PATENT DOCUMENTS

| 2012/0222041 | A1* | 8/2012 | Sabin ................. | H04L 67/1008 |
| | | | | 718/105 |
| 2014/0122725 | A1* | 5/2014 | Batrouni ............. | H04L 67/2842 |
| | | | | 709/226 |

(Continued)

*Primary Examiner* — Robert B Harrell
(74) *Attorney, Agent, or Firm* — Troutman Pepper Hamilton Sanders LLP

(57) ABSTRACT

The disclosed technology includes accessing a first network application programming interface exposed by a first cloud provider of the plurality of cloud providers to identify a first pricing profile, the first pricing profile associated with the first Cloud provider. Upon identifying the first pricing profile, accessing a second network application programming interface exposed by a second cloud provider of the plurality of cloud providers to identify a second pricing profile, the second pricing profile associated with the second Cloud provider. A load balancing decision is determined comparing the identified first pricing profile with the identified second pricing profile. Next, the determined load balancing decision is executed on a monitored computing-traffic.

20 Claims, 5 Drawing Sheets

(58) Field of Classification Search
USPC .................................. 709/215, 226, 224
See application file for complete search history.

(56) References Cited

U.S. PATENT DOCUMENTS

| | | | |
|---|---|---|---|
| 2014/0278807 A1* | 9/2014 | Bohacek | G06Q 30/0206 705/7.35 |
| 2014/0304704 A1* | 10/2014 | Kruglick | G06F 9/45533 718/1 |
| 2015/0234670 A1* | 8/2015 | Shimogawa | G06F 9/45533 718/1 |
| 2016/0057214 A1* | 2/2016 | Anand | G06F 9/505 709/226 |
| 2017/0230451 A1* | 8/2017 | Paramasivam | G06F 16/24573 |
| 2018/0288138 A1* | 10/2018 | Venkiteswaran | H04L 67/1002 |

* cited by examiner

METHODS FOR SERVER LOAD BALANCING IN A CLOUD ENVIRONMENT USING DYNAMIC CLOUD PRICING AND DEVICES THEREOF

CROSS-REFERENCE TO RELATED APPLICATION(S)

This document is a non-provisional patent application claiming the benefit of, and priority to, U.S. Provisional Patent Application Ser. No. 62/517,030, filed on Jun. 8, 2017, also entitled "METHODS FOR SERVER LOAD BALANCING USING DYNAMIC CLOUD PRICING AND DEVICES THEREOF," which is hereby incorporated by reference in its entirety.

TECHNICAL FIELD

Generally, the present disclosure technically relates to application traffic management (ATM) technologies. More particularly, the present disclosure technically relates to application traffic management (ATM) technologies for cloud computing infrastructure and services. Even more particularly, the present disclosure technically relates to application traffic management (ATM) technologies for hybrid cloud computing infrastructure and services.

BACKGROUND

The Cloud provider industry is teeming with many vendors, such as Amazon (AWS), Microsoft (Azure), Rackspace, Digital Ocean, and Google Compute Engine. As the number of Cloud vendors increases, a desire has arisen with many Cloud customers for transparently deploying applications and services across many vendors to take advantage of redundancy, reliability, scalability, and cost savings. To enable efficient platform-independent deployment, development operation (DevOp) methodologies, leveraging Docker Containers, have been developed which largely solve the cross-Cloud deployment challenges.

Thus, managing a web service deployment across many different providers has become quite feasible. However, the related art still experiences challenges in economically optimizing the distribution of native-cloud or hybrid-based web services across non-homogeneous Cloud providers. Accordingly, a need exists in the related art for a more cost-efficient load-balancing system.

SUMMARY

To address at least the challenges experienced in the related art, the subject matter of the present disclosure involves load-balancing systems, apparatuses, devices, and methods for economically optimizing the distribution of native-cloud or hybrid-based web services across non-homogeneous Cloud providers. The present disclosure involves systems, apparatuses, devices, and methods involving a load balancer operable by way of a processor in response to a set of executable instructions storable in relation to a memory device, the set of executable instructions comprising a load-balancing algorithm, the load-balancing algorithm leveraging static pricing data and real-time pricing data for Cloud resources from various Cloud vendors, collected via a representational state transfer application program interface, in combination with information obtained from profiling traffic patterns, whereby the most economical Cloud provider of a plurality of Cloud providers or the most economical combination of Cloud providers of the plurality of Cloud providers is determined to load balance traffic for a given web service.

In accordance with an embodiment of the present disclosure, a method of load balancing by way of a network traffic management system comprises: monitoring computing-traffic for each Cloud provider of a plurality of Cloud providers to determine a traffic profile for each Cloud provider of the plurality of Cloud providers; accessing a first network application programming interface (API) exposed by a first Cloud provider of the plurality of Cloud providers to identify a first pricing profile, the first pricing profile associated with the first Cloud provider; accessing a second network application programming interface (API) exposed by a second Cloud provider of the plurality of Cloud providers to identify a second pricing profile, the second pricing profile associated with the second Cloud provider; and comparing the first pricing profile with the second pricing profile to influence a load balancing decision, thereby providing a pricing profile comparison.

In accordance with an embodiment of the present disclosure, a network traffic management apparatus comprises a load balancer, and a memory device having a set of executable instructions stored thereon, and at least one processor operable by the set of executable instructions to: monitor computing-traffic for each Cloud provider of a plurality of Cloud providers to determine a traffic profile for each Cloud provider of the plurality of Cloud providers; access a first network application programming interface (API) exposed by a first Cloud provider of the plurality of Cloud providers to identify a first pricing profile, the first pricing profile associated with the first Cloud provider; access a second network application programming interface (API) exposed by a second Cloud provider of the plurality of Cloud providers to identify a second pricing profile, the second pricing profile associated with the second Cloud provider; and compare the first pricing profile with the second pricing profile to influence a load balancing decision, whereby a pricing profile comparison is providable.

In accordance with an embodiment of the present disclosure, a method of providing a network traffic management apparatus comprises: providing a load balancer; and providing a processor configured, by a set of executable instructions storable in relation to a memory device, to: monitor computing-traffic for each Cloud provider of a plurality of Cloud providers to determine a traffic profile for each Cloud provider of the plurality of Cloud providers; access a first network application programming interface (API) exposed by a first Cloud provider of the plurality of Cloud providers to identify a first pricing profile, the first pricing profile associated with the first Cloud provider; access a second network application programming interface (API) exposed by a second Cloud provider of the plurality of Cloud providers to identify a second pricing profile, the second pricing profile associated with the second Cloud provider; and compare the first pricing profile with the second pricing profile to influence a load balancing decision, whereby a pricing profile comparison is providable.

Some of the features in the present disclosure are broadly outlined in order that the section, entitled Detailed Description, is better understood and that the present contribution to the art by the present disclosure is better appreciated. Additional features of the present disclosure are described hereinafter. In this respect, understood is that the present disclosure is not limited in its implementation to the details of the components or steps as set forth herein or as illustrated in the several figures of the Drawing, but are capable of being carried out in various ways which are also encompassed by the present disclosure. Also, understood is that the phraseology and terminology employed herein are for illustrative purposes in the description and are not regarded as limiting.

BRIEF DESCRIPTION OF THE DRAWING

The above, and other, aspects, and features, of the several embodiments in the present disclosure will be more apparent from the following Detailed Description as presented in conjunction with the following several figures of the Drawing.

DETAILED DESCRIPTION

Embodiments are disclosed that implement load-balancing across a plurality of non-homogeneous Cloud providers, wherein each cloud provider of the plurality of non-homogeneous cloud providers implements both static pricing models and dynamic real-time pricing models. Generally, embodiments of the present disclosure implement load-balancing in relation to non-homogeneous Cloud resources. wherein cost models for leased Cloud resources may be dynamically changing. Embodiments of the present disclosure include, but are not limited to, a load-balancer configured to discover static pricing and real-time pricing for Cloud resources from various Cloud providers. The static pricing and real-time pricing is coupled with information obtained from profiling traffic patterns for determining an economical Cloud provider or a combination of Cloud providers to load-balance traffic for a given web service.

Figure 1:
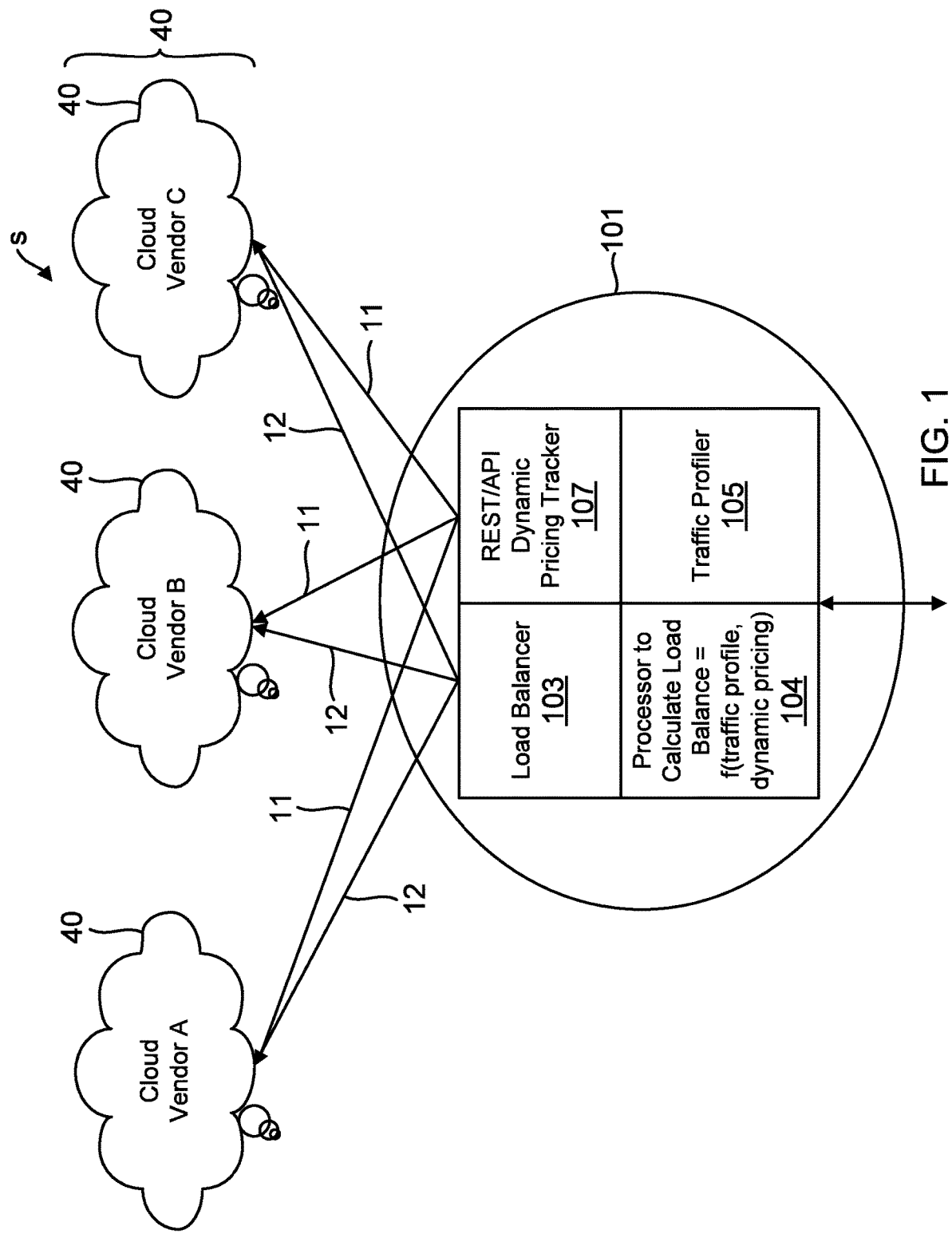
FIG. 1 is a diagram illustrating an exemplary network environment which incorporates an exemplary network traffic management system, in accordance with an embodiment of the present disclosure.
Figure 2:
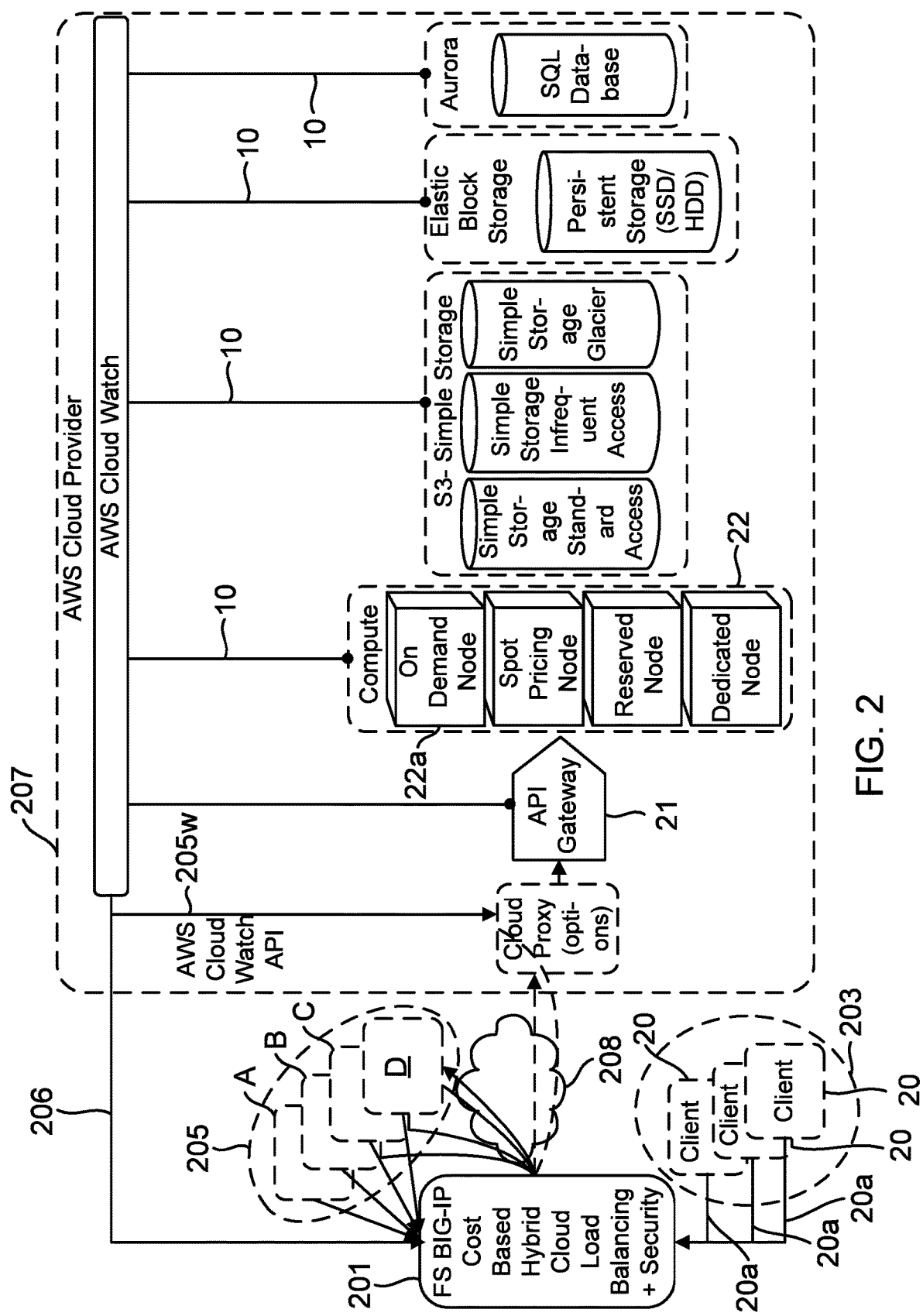
FIG. 2 is a diagram illustrating a network traffic management system, configured to provide load-balancer services in communication with a plurality of client computing devices and a plurality of Cloud providers, in accordance with an embodiment of the present disclosure.

Referring to FIG. 1, this diagram illustrates an exemplary network environment implementing an exemplary network traffic management system S, in accordance with an embodiment of the present disclosure. The network traffic management system S, in this example, comprises a network traffic management apparatus 101, the network traffic management apparatus 101 configured to couple with at least one of a plurality of server devices 10 and a plurality of client devices 20 via at least one communication network(s) 30 (FIG. 2). Alternatively, the network traffic management apparatus 101, the plurality of server devices 10, and the plurality of client devices 20 may be coupled together via other topologies, in accordance with alternative embodiments of the present disclosure. Additionally, the network traffic management system S further comprises at least one other network device, such as at least one router and at least one switch, for example.

Still referring to FIG. 1, each Cloud provider 40 of a plurality of Cloud providers 40, e.g., Cloud Vendors A, B, C, D, is operatively coupled with, or connected to, the network traffic management apparatus 101, in accordance with an embodiment of the present disclosure. Each Cloud provider 40 services a plurality of customers by providing the plurality of customers with a virtual execution environment, wherein at least one customer application program (hereinafter "customer App") is implementable. For example, in some instances, a plurality of Cloud providers 40 may share a customer; and that particular customer may implement a common customer App configured to execute in relation to a plurality of Cloud providers 40.

Still referring to FIG. 1, the traffic management apparatus 101 comprises and implements a load balancer 103, in accordance with an embodiment of the present disclosure. The load balancer 103 comprises at least one of an application program and a service that distributes a computing load across a plurality of server devices 10 in an effort to normalize the execution burden of each server device 10 of the plurality of server devices 10. In this embodiment, the load balancer 103 operates to balance an execution load across the plurality of Cloud providers 40, e.g., Cloud Vendors A, B, C, D, for a particular customer App. The traffic management apparatus 101 further comprises a traffic profiler 105 configured to monitor and compute profiles for traffic loads in relation to each Cloud provider 40 of the plurality of Cloud providers 40. The traffic profiler 105 enables the load balancer 103 to make informed decisions as to which server device 10 of the plurality of server devices 10 is capable of sustaining a greater computing load than other server devices 10 of the plurality of server devices 10.

Still referring to FIG. 1, the traffic management apparatus 101 further comprises a pricing tracker 107, in accordance with an embodiment of the present disclosure. The pricing tracker 107 is configured to query, via various network or web services, pricing models for each of at least one server device 10, e.g., of the plurality of server devices 10. To better appreciate the pricing tracker 107, a brief discussion of Cloud-service pricing structures is provided as follows. Different pricing models are used by various Cloud providers, e.g., Cloud Vendors A, B, C, D, such as fixed cost contracts, short-term contracts, and long-term contracts. However, some cloud providers may also use an additional pricing option that dynamically adjusts resource pricing as a function of demand and resource availability. This pricing option may be referred to as "spot pricing" and may vary by approximately 10% to approximately 15% within short periods of time, e.g., by the minute. Cloud providers typically provide an application programming interface, such as a representational state transfer application program interface (hereinafter "REST API," "RESTful API," or a "SOAP API"), such as a pricing REST service 11, to access static pricing models and real-time pricing models. In addition to charging for "compute" instances, the Cloud providers may also charge for other services, such as network interface bandwidth, storage bandwidth, website traffic 12, and, perhaps, other leased elements, such as API Gateways 21 and load balancers.

Still referring to FIG. 1, the load balancer 103 is responsive to a processor 104 of the apparatus 101, operable by a set of instructions for balancing computing load, wherein the load balancer 103 is configured to implement an algorithm for balancing the computing load over the plurality of Cloud providers 40 based on a combination of traffic pattern profiles and pricing data, in accordance with an embodiment of the present disclosure. In another embodiment, the pricing data comprises both static pricing data and real-time pricing data. This embodiment of the load balancer 103 is configured to use both static pricing data and dynamic real-time pricing data for each Cloud provider 40 of the plurality of Cloud providers 40, in combination with traffic data obtained via profiling traffic traversing the load balancer 103, for at least one of computing, determining, optimizing, and economizing mapping of traffic for Cloud resources, whereby economic-based load-balancing is achievable by using a network-based API to collect dynamic cloud pricing and to improve load balancing decisions in relation to a plurality of Cloud providers, e.g., the plurality of Cloud providers 40.

Referring to FIG. 2, a network traffic management system S, configured to provide load-balancer services, e.g., via a load balancer 201, in communication with a plurality of client computing devices 203, e.g., the plurality of client devices 20, and a plurality of Cloud providers 205, e.g., the plurality of Cloud vendors A, B, C, D, in accordance with an embodiment of the present disclosure. The load balancer 201 services interfaces 20a of the plurality of client computing devices 203 and the plurality of Cloud providers 205. By example only, the load balancer 201 comprises an F5® Big-IP cost-based hybrid-Cloud load balancer having a security feature. The load balancer 201 may implement a code to access an API that is exposed by at least one Cloud provider 205 of the plurality of Cloud providers 205 for identifying a current pricing model for use of such at least one Cloud provider 205. In one example, a Cloud provider 207 of the at least one Cloud provider 205 may expose a "cloud watch" API 205w that provides access to various data maintained by the Cloud provider 207, such as metrics, log files, various alarms, and the like. The cloud watch API 205w provides current pricing for computing instances on that particular Cloud provider 207.

Still referring to FIG. 2, the load balancer 201 uses the cloud watch API 205w to monitor various traffic data and current pricing data for the Cloud provider 207 as well as similar APIs of an AWS Cloud watch API 206 for the various other cloud providers 205, in accordance with an embodiment of the present disclosure. Such various traffic data and current pricing data may be used to compute an appropriate server device 10 on which to execute at least one process in an economically efficient manner.

Still referring to FIG. 2, the at least one processor 104 of the apparatus 101 is further operable by the set of executable instructions to: orchestrate, via a first orchestrator located in the Cloud 208, the load balancer 201 comprising a hybrid-Cloud load balancer; and orchestrate, via the hybrid-Cloud load balancer acting as a second orchestrator, Cloud resources. The at least one processor 104 is further operable by the set of executable instructions to: orchestrate, via the hybrid-Cloud load balancer acting as a second orchestrator, by utilizing at least one balancer metric of: a number of connections per node of a plurality of nodes 22 and a response time for spawning nodes 22a on demand in the Cloud 208 through a Cloud resource management API, e.g., the AWS Cloud watch API 206.

Figure 3:
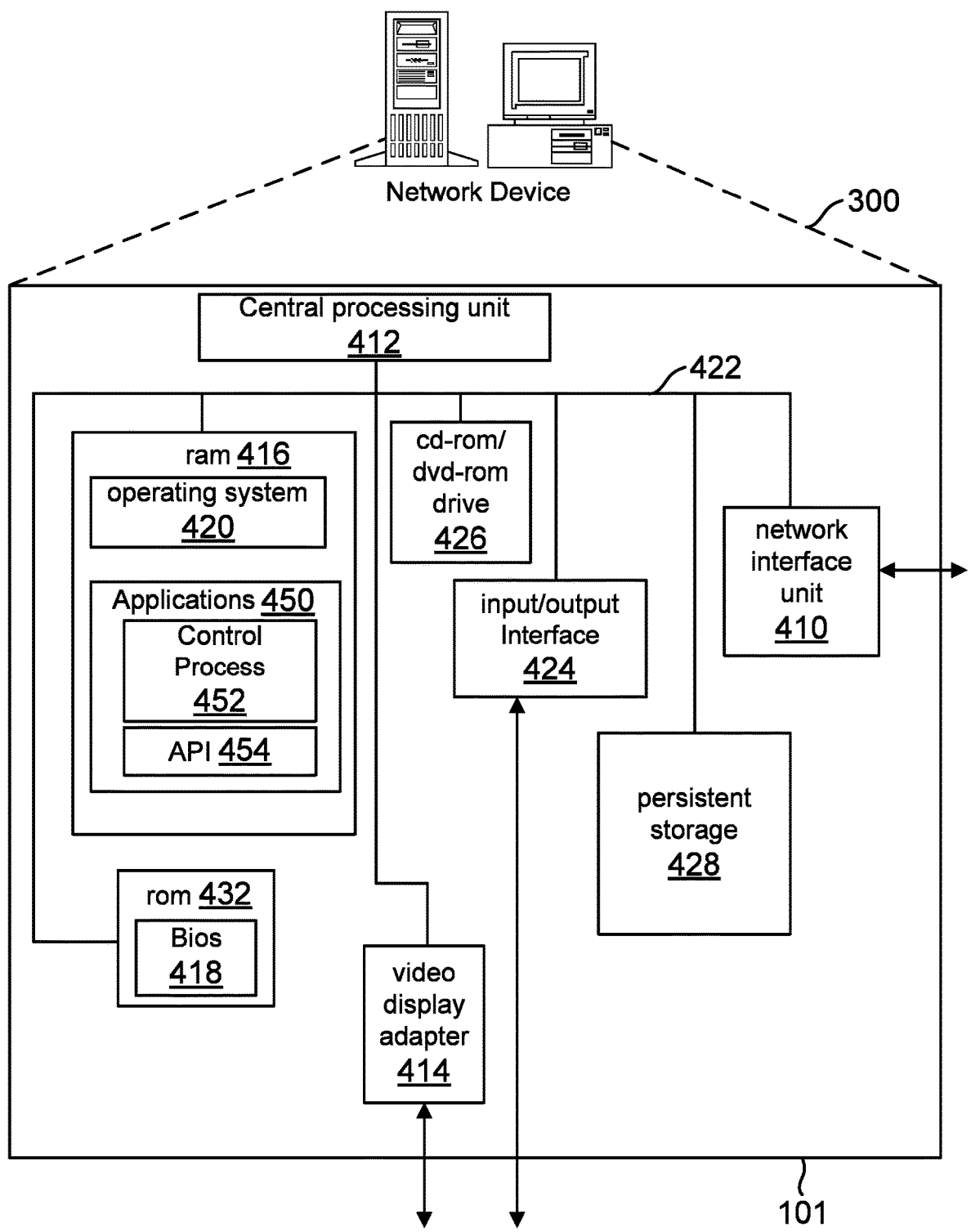
FIG. 3 is a diagram illustrating several components of a network traffic management apparatus, comprising at least one of: at least one processor, at least one memory device, and at least one communication interface, in accordance with an embodiment of the present disclosure.

Referring to FIG. 3, this diagram illustrates several components of a network traffic management apparatus 101 implementable with a network device 300, the network traffic management apparatus 101 comprising at least one of: a central processing unit 412, comprising at least one processor 104, at least one memory device, such as at least one of a transient memory device 416, e.g., a random-access (RAM) memory device, and a persistent memory device 428, and at least one communication interface, such as an input/output (I/O) interface 424 and a network interface unit 410, in accordance with an embodiment of the present disclosure. These several components are coupled together by a bus 422 or other communication link. The network traffic management apparatus 101 further comprises a CD-ROM/DVD-ROM drive 426, a video display adapter 414, and a read-only memory (ROM) device 432, wherein the ROM device comprises a basic input/output system (BIOS) firmware device 418. The network traffic management apparatus 101 further, or alternatively, comprises other types and/or other numbers of elements in other configurations, in accordance with other embodiments of the present disclosure. The video display adapter 414 and the I/O interface 424 are configured to communicate with the plurality of client devices 20.

Still referring to FIG. 3, the central processing unit 412, comprising the at least one processor 104, of the network traffic management apparatus 101 may execute programmed instructions, e.g., via Applications 450, stored in the at least one memory device, such as at least one of the transient memory device 416 and the persistent memory device 428, for the any number of the above-described functions. The transient memory device 416 may further have stored thereon an operating system (O/S) 420. The central processing unit 412, comprising the at least one processor 104, of the network traffic management apparatus 101 comprises at least one central processing unit (CPU) or at least one general-purpose processor having at least one processing core, for example. The central processing unit 412 comprises any other type of processor, in accordance with other embodiments of the present disclosure. The Applications 450 comprise at least one of a control-process application 452 and an API 454.

Still referring to FIG. 3, the memory device of the network traffic management apparatus 101 stores these programmed instructions for at least one aspect of the technologies, as herein described and illustrated, although some, or all, of the programmed instructions may be stored elsewhere and are still encompassed by the embodiments of the present disclosure. The memory device of the network traffic management apparatus 101 comprises any type of memory storage devices, such as random-access memory (RAM), read-only memory (ROM), hard disk, solid state drives, flash memory, and any other computer-readable medium which is read from, and written to, a magnetic system, an optical system, or other reading and writing system that is coupled with, or in communication with, the at least one processor.

Still referring to FIG. 3, the memory device of the network traffic management apparatus 101 is configured to store at least one application program comprising computer-executable instructions that, when executed by the network traffic management apparatus 101, configure the the network traffic management apparatus 101 to perform actions, such as transmitting, receiving, or otherwise processing messages, for example, and to perform other below-described actions. The at least one application program can be implemented as a module or a component of other application programs. Further, the at least one application program can be implemented as an operating system extension, a module, a plugin, or the like.

Still referring to FIG. 3, the at least one application program may be operative in a Cloud-based computing environment. The at least one application program is executable within, as a virtual machine, or as a virtual server that is manageable in a Cloud-based computing environment. Also, the at least one application program, and even the network traffic management apparatus 101 itself, may be located in virtual server(s) running in a Cloud-based computing environment, rather than being tied to one or more specific physical network computing devices. Also, the at least one application program may be running in one or more virtual machines (VMs) executing on the network traffic management apparatus 101. Additionally, in one or more embodiments of this technology, virtual machine(s) running on the network traffic management apparatus 101 may be managed or supervised by a hypervisor, in accordance with other embodiments of the present disclosure.

Still referring to FIG. 3, the memory device of the network traffic management apparatus 101 may comprise information relating to various policies, modules, databases, or applications, for example, in accordance with other embodiments of the present disclosure. In such other embodiments, the memory device comprises components to implement a load balancer that efficiently and economically distributes computing traffic across a plurality of Cloud providers.

Referring back to FIGS. 1-3, the load balancer is configured to perform the following actions: (1) monitoring an API for various Cloud providers to obtain dynamic web pricing for Cloud resources, such as Bandwidth, API Gateway, Compute Elements, SQL databases, etc.; (2) monitoring and characterizing traffic associated with various webservices to determine metrics which might include average bandwidth, peak bandwidth, connections per second, L7 application, storage, web site traffic, API gateway traffic, and the like; (3) determining an economically preferential mapping of each webservice to a specific Cloud vendor based on static/dynamic Cloud resource pricing and characterized resources required by the associated web-service; (4) load-balancing web-service traffic to most economical cloud resources; and (5) iterating the foregoing actions, i.e., action (1) through action (4), to track dynamic changes in API-provided cloud resource pricing and changes in web-service traffic and to dynamically update load balance decisions, in accordance with embodiments of the present disclosure. The load balancer is configured to use dynamic cloud pricing data which provides quantifiable cost savings to web-service providers and provides a competitive advantage to load balancing across Cloud providers.

Referring back to FIGS. 1-3, additionally, one or more of the devices that together comprise the network traffic management apparatus in other examples can be standalone devices or integrated with one or more other devices or apparatuses, such as one of the server devices, for example. Moreover, one or more of the devices of the network traffic management apparatus in these examples can be in a same or a different communication network including one or more public, private, or cloud networks, for example.

Figure 4:
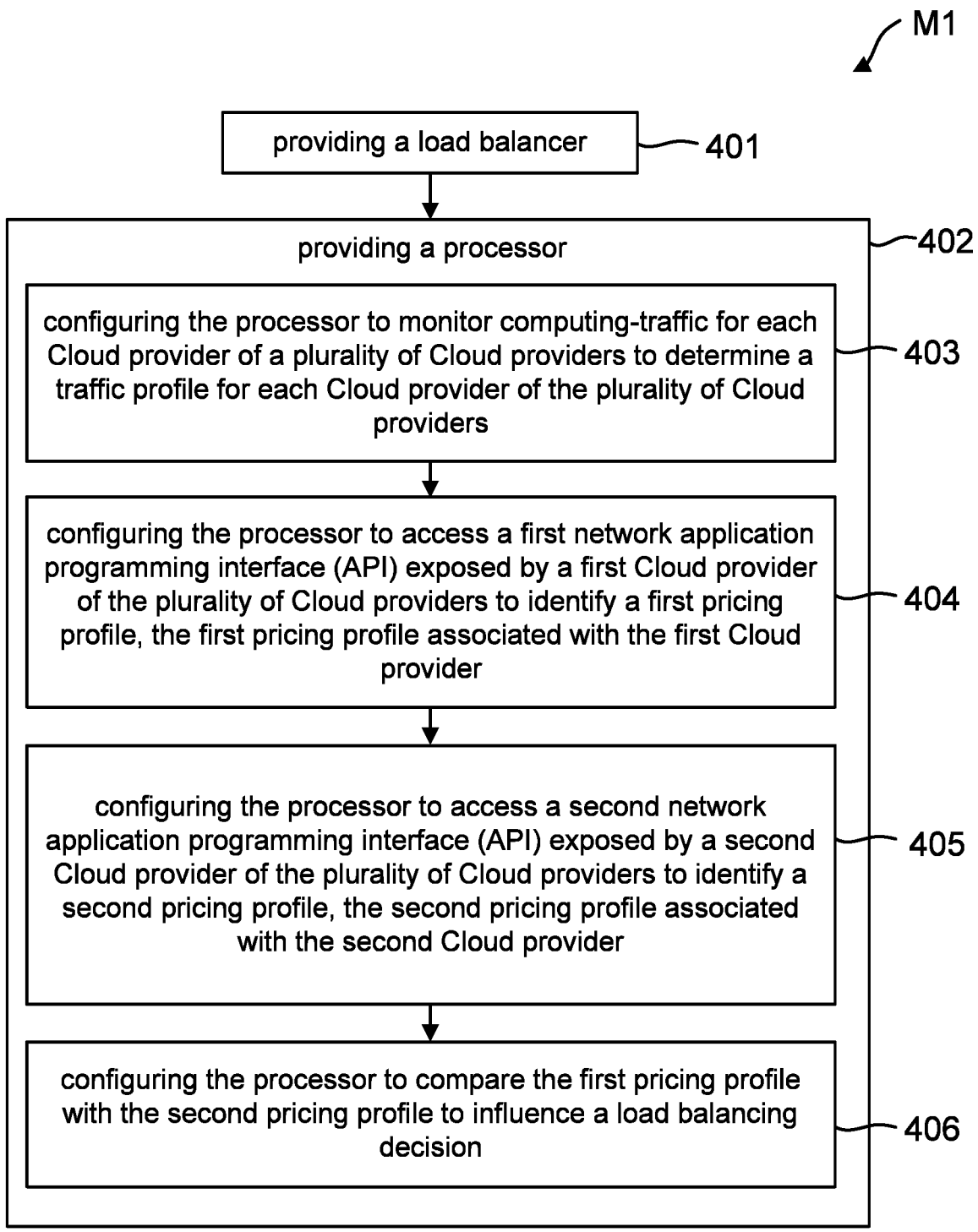
FIG. 4 is a flow diagram illustrating a method of providing a network traffic management apparatus, in accordance with an embodiment of the present disclosure.

Referring to FIG. 4, this flow diagram illustrates a method M1 of providing a network traffic management apparatus 101, in accordance with an embodiment of the present disclosure. The method M1 comprises: providing a load balancer, e.g., the load balancer 103, as indicated by block 401; and providing a processor, e.g., the processor 104, providing the processor comprising configuring the processor, by a set of executable instructions storable in relation to a memory device, e.g., the device 416, as indicated by block 402, to: monitor computing-traffic for each Cloud provider, e.g., the Cloud provider 40, of a plurality of Cloud providers, e.g., the plurality of Cloud providers 40, to determine a traffic profile for each Cloud provider of the plurality of Cloud providers, as indicated by block 403; access a first network application programming interface (API) exposed by a first Cloud provider of the plurality of Cloud providers to identify a first pricing profile, the first pricing profile associated with the first Cloud provider, as indicated by block 404; access a second network application programming interface (API) exposed by a second Cloud provider of the plurality of Cloud providers to identify a second pricing profile, the second pricing profile associated with the second Cloud provider, as indicated by block 405; and compare the first pricing profile with the second pricing profile to influence a load balancing decision, as indicated by block 406, whereby a pricing profile comparison is providable.

Figure 5:
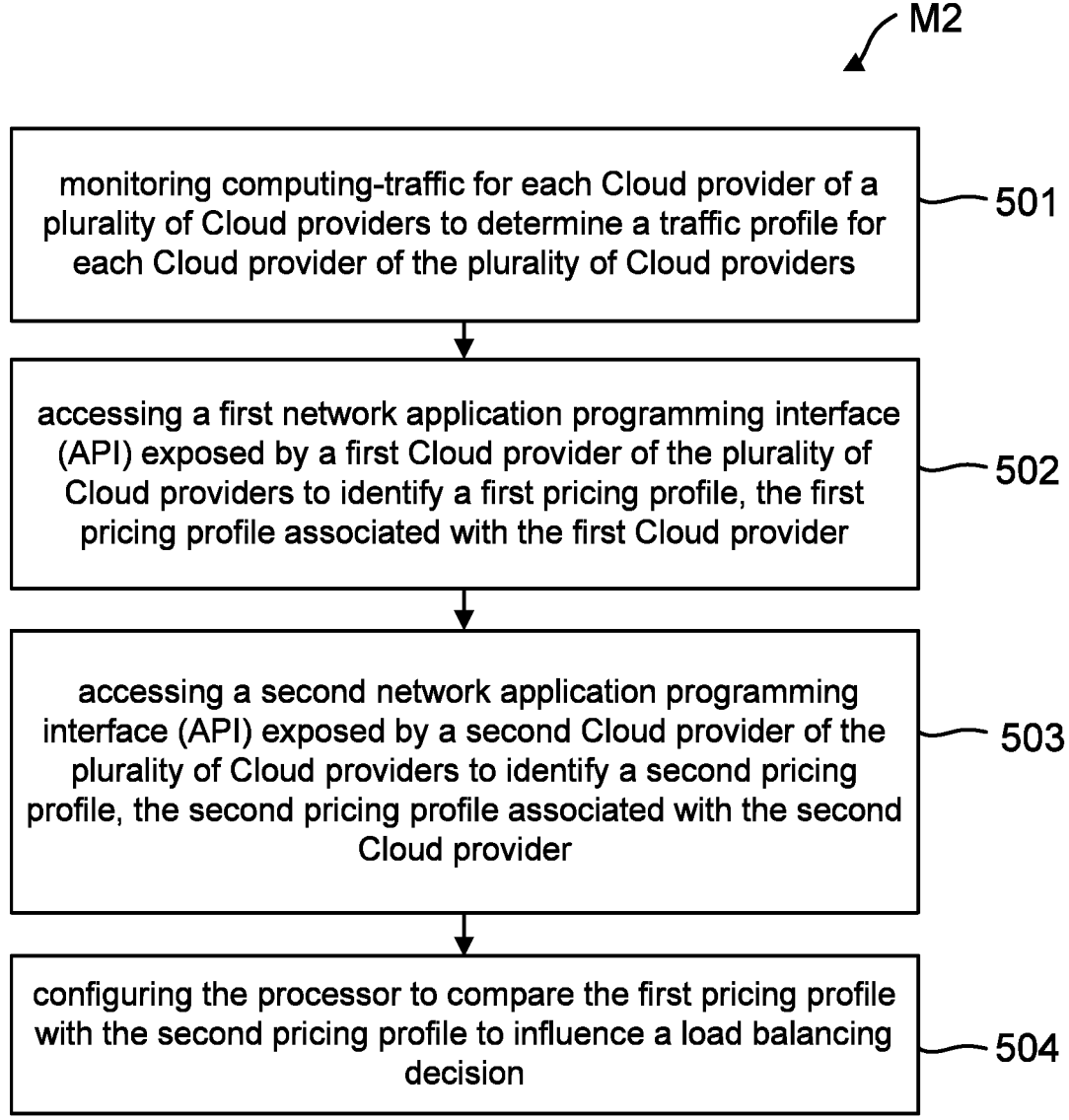
FIG. 5 is a flow diagram illustrating a method of load balancing by way of a network traffic management system comprising a network traffic management apparatus, in accordance with an embodiment of the present disclosure Corresponding reference numerals or characters indicate corresponding components throughout the several figures of the Drawing. Elements in the several figures are illustrated for simplicity and clarity and have not necessarily been drawn to scale. For example, the dimensions of some elements in the figures are emphasized relative to other elements for facilitating understanding of the various presently disclosed embodiments. Also, well-understood elements that are useful or necessary in commercially feasible embodiment are often not depicted to facilitate a less obstructed view of these various embodiments of the present disclosure.

Referring to FIG. 5, this flow diagram illustrates a method M2 of load balancing by way of a network traffic management system S comprising a network traffic management apparatus, in accordance with an embodiment of the present disclosure. The method M2 comprises: monitoring computing-traffic for each Cloud provider of a plurality of Cloud providers to determine a traffic profile for each Cloud provider of the plurality of Cloud providers, as indicated by block 501; accessing a first network application programming interface (API) exposed by a first Cloud provider of the plurality of Cloud providers to identify a first pricing profile, the first pricing profile associated with the first Cloud provider, as indicated by block 502; accessing a second network application programming interface (API) exposed by a second Cloud provider of the plurality of Cloud providers to identify a second pricing profile, the second pricing profile associated with the second Cloud provider, as indicated by block 503; and comparing the first pricing profile with the second pricing profile to influence a load balancing decision, as indicated by block 504, thereby providing a pricing profile comparison.

Referring back to FIGS. 1-5, any system, apparatus, devices, including the load balancer, or method of the present disclosure may be implemented in relation to a customer, such as a financial institution, e.g., a bank. In operation, e.g., in relation to a banking customer, for example, the band servers reside behind the load balancer in at least one Cloud environment of at least one Cloud vendor. All traffic to the servers in the at least one Cloud environment of at least one Cloud vendor would traverse through the load balancer before being load-balanced to a Cloud vendor server of the at least one Cloud vendor, e.g., the plurality of Cloud vendors. In a more generalized deployment of any system, apparatus, devices, or method of the present disclosure, the bank servers are located in a private data center that is directly coupled with, or connected to, the load balancer (hybrid cloud).

Still referring back to FIGS. 1-5, any system, apparatus, device, or method of the present disclosure may implement a cost-based load-balancing algorithm, wherein the cost-based load-balancing algorithm comprises instructions for making cost-based decisions to determine load-balancing traffic (a) to at least one Cloud server of a plurality of different, heterogenous, or non-homogenous, Cloud vendors or (b) to at least one local server in the private data center, and wherein making cost-based decisions comprises utilizing private data center recurring cost-metrics, such as power cost, information technology (IT) management cost, and space cost, in a more general solution. By example only, traffic flows and is load-balanced as follows:

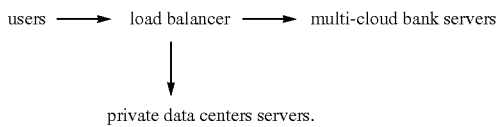

Still referring back to FIGS. 1-5, in the banking example, any system, apparatus, device, or method of the present disclosure may involve all traffic traversing the load balancer, whereby the load balancer profiles the traffic, and whereby the load balancer profiles behavior of the application (or App) to determine the Cloud vendor that provides the most cost-effective solution. For example, profiling the App comprises observing: (a) a rate of client requests to determine an average rate of client requests, e.g., the average client requests/second, (b) client request sizes to determine an average client request size, (c) bank server response sizes to determine an average bank server response size, and (d) any other metric relating to the App. Additionally, the load balancer is configured to make requests to the Cloud vendor APIs on a per-server basis, to collect CPU utilization, and to determine the workload overhead, thereby facilitating further profiling the bank App to the compute-instance level.

Further, the communication interface of the network traffic management apparatus 101 operatively couples, and provides communication among, the network traffic management apparatus 101, the plurality of server devices 10, and/or plurality of client devices 20, in accordance with embodiments of the present disclosure. The communication interface may comprise any number and type of communication network, system, connection, device, and/or element, in accordance with embodiments of the present disclosure. By way of example only, the communication network(s) can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s) (e.g., for when a device illustrated in FIG. 1, such as the network traffic management apparatus, one or more of the client devices, or one or more of the server devices operate as virtual instances on the same physical machine).

While the network traffic management apparatus 101 is illustrated in this example as including a single device, the network traffic management apparatus in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus.

Each of the server devices of the network traffic management system in this example includes one or more processors, a memory, and a communication interface, which are coupled together by a bus or other communication link, although other numbers and/or types of network devices could be used. The server devices in this example process requests received from the client devices via the communication network(s) according to the HTTP-based application RFC protocol, for example. Various applications may be operating on the server devices and transmitting data, e.g., files or Web pages, to the client devices via the network traffic management apparatus in response to requests from the client devices. The server devices may be hardware or software or may represent a system with multiple servers in a pool, which may include internal or external networks.

Although the server devices are illustrated as single devices, one or more actions of each of the server devices may be distributed across one or more distinct network computing devices that together comprise one or more of the server devices. Moreover, the server devices are not limited to a particular configuration. Thus, the server devices may contain a plurality of network computing devices that operate using a master/slave approach, whereby one of the network computing devices of the server devices operate to manage and/or otherwise coordinate operations of the other network computing devices. The server devices may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices can operate within the network traffic management apparatus itself rather than as a stand-alone server device communicating with the network traffic management apparatus via the communication network(s). In this example, the one or more server devices operate within the memory of the network traffic management apparatus.

Although the exemplary network traffic management system with the network traffic management apparatus, server devices, client devices, and communication network(s) are described and illustrated herein, other types and/or numbers of systems, devices, components, and/or elements in other topologies can be used. Understood is that the systems of the examples, described herein, are for exemplary purposes, as many variations of the hardware, firmware, and software used to implement the examples are possible and are encompassed by the present disclosure.

One or more of the components depicted in the network traffic management system, such as the network traffic management apparatus, client devices, or server devices, for example, may be configured to operate as virtual instances on the same physical machine. In other words, one or more of the network traffic management apparatus, client devices, or server devices may operate on the same physical device rather than as separate devices communicating through communication network(s). Additionally, there may be more or fewer network traffic management apparatus, client devices, or server devices than illustrated in FIG. 1. The client devices could also be implemented as applications on the network traffic management apparatus itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, any particular order to steps or stages of methods or processes described in this disclosure is not intended or implied. In many cases the order of process steps is varied without changing the purpose, effect, or import of the methods described.

Information, as herein shown and described in detail, is fully capable of attaining the above-described embodiments of the present disclosure, and is, thus, representative of the subject matter which is broadly contemplated by the present disclosure. The scope of the present disclosure fully encompasses other embodiments and is to be limited, accordingly, by nothing other than the appended claims, wherein any reference to an element being made in the singular is not intended to mean "one and only one" unless explicitly so stated, but rather "one or more." All structural and functional equivalents to the elements of the above-described embodiments and additional embodiments are hereby expressly incorporated by reference and are intended to be encompassed by the present claims.

Moreover, no requirement exists for a device, an apparatus, a system, or a method to address each, and every, problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail is made, without departing from the spirit and scope of the present disclosure, as set forth in the appended claims, as is apparent, or may become apparent, are also encompassed by the present disclosure.

What is claimed:

1. A network traffic management apparatus comprising a memory having programmed instructions stored thereon and at least one processor configured to be capable of executing the stored programmed instructions to:
   utilize a plurality of application programming interfaces (APIs) exposed by a plurality of cloud provider networks to obtain a plurality of pricing profiles, wherein each of the pricing profiles is associated with one of the cloud provider networks;
   monitor network traffic associated with at least one web service to determine one or more metrics associated with the web service;
   determine a load balancing decision based on a correlation of one or more of the pricing profiles associated with the cloud provider networks with at least a subset of the determined metrics associated with the web service; and
   execute the determined load balancing decision on computing-traffic associated with the web service to direct the computing-traffic to one or more server instances hosted by at least one of the cloud provider networks.

2. The network traffic management apparatus of claim 1, wherein the at least one processor is further configured to be capable of executing the stored programmed instructions to:
   orchestrate, via a first orchestrator located in a cloud, a load balancer comprising a hybrid-cloud load balancer and, via the hybrid-cloud load balancer acting as a second orchestrator, a plurality of cloud resources; and
   utilize at least one of a number of connections per node or a response time for spawning one or more nodes on demand in the cloud through a cloud resource management API to orchestrate the cloud resources.

3. The network traffic management apparatus of claim 2, wherein the at least one processor is further configured to be capable of executing the stored programmed instructions to characterize the monitored network traffic to identify a plurality of cloud resources required by the web service based on the metrics, wherein the one or more of the pricing profiles comprise pricing data for the cloud resources.

4. The network traffic management apparatus of claim 1, wherein one or more of the pricing profiles comprise dynamic web pricing data for one or more cloud resources.

5. The network traffic management apparatus of claim 1, wherein the at least one processor is further configured to be capable of executing the stored programmed instructions to direct at least a portion of the computing-traffic that is from a client of both a first cloud provider and a second cloud provider to either a first one of the cloud provider networks hosted by the first cloud provider or a second one of the cloud provider networks hosted by the second cloud provider based on the load balancing decision.

6. A non-transitory computer readable medium having stored thereon instructions for load-balancing comprising executable code, which when executed by at least one processor, cause the at least one processor to:
   utilize a plurality of application programming interfaces (APIs) exposed by a plurality of cloud provider networks to obtain a plurality of pricing profiles, wherein each of the pricing profiles is associated with one of the cloud provider networks;
   monitor network traffic associated with at least one web service to determine one or more metrics associated with the web service;
   determine a load balancing decision based on a correlation of one or more of the pricing profiles associated with the cloud provider networks with at least a subset of the determined metrics associated with the web service; and execute the determined load balancing decision on computing-traffic associated with the web service to direct the computing-traffic to one or more server instances hosted by at least one of the cloud provider networks.

7. The non-transitory computer readable medium of claim 6, wherein the executable code, when executed by the at least one processor, further cause the at least one processor to:

orchestrate, via a first orchestrator located in a cloud, a load balancer comprising a hybrid-cloud load balancer and, via the hybrid-cloud load balancer acting as a second orchestrator, a plurality of cloud resources; and utilize at least one of a number of connections per node or a response time for spawning one or more nodes on demand in the cloud through a cloud resource management API to orchestrate the cloud resources.

8. The non-transitory computer readable medium of claim 7, wherein the executable code, when executed by the at least one processor, further cause the at least one processor to characterize the monitored network traffic to identify a plurality of cloud resources required by the web service based on the metrics, wherein the one or more of the pricing profiles comprise pricing data for the cloud resources.

9. The non-transitory computer readable medium of claim 6, wherein one or more of the pricing profiles comprise dynamic web pricing data for one or more cloud resources.

10. The non-transitory computer readable medium of claim 6, wherein the executable code, when executed by the at least one processor, further cause the at least one processor to direct at least a portion of the computing-traffic that is from a client of both a first cloud provider and a second cloud provider to either a first one of the cloud provider networks hosted by the first cloud provider or a second one of the cloud provider networks hosted by the second cloud provider based on the load balancing decision.

11. A network traffic management system comprising one or more network traffic manager apparatuses, client device, or server devices with memory comprising programmed instructions stored thereon and one or more processors configured to be capable of executing the stored programmed instructions to:

utilize a plurality of application programming interfaces (APIs) exposed by a plurality of cloud provider networks to obtain a plurality of pricing profiles, wherein each of the pricing profiles is associated with one of the cloud provider networks;

monitor network traffic associated with at least one web service to determine one or more metrics associated with the web service;

determine a load balancing decision based on a correlation of one or more of the pricing profiles associated with the cloud provider networks with at least a subset of the determined metrics associated with the web service; and execute the determined load balancing decision on computing-traffic associated with the web service to direct the computing-traffic to one or more server instances hosted by at least one of the cloud provider networks.

12. The network traffic management system of claim 11, wherein the one or more processors are further configured to be capable of executing the stored programmed instructions to:

orchestrate, via a first orchestrator located in a cloud, a load balancer comprising a hybrid-cloud load balancer and, via the hybrid-cloud load balancer acting as a second orchestrator, a plurality of cloud resources; and utilize at least one of a number of connections per node or a response time for spawning one or more nodes on demand in the cloud through a cloud resource management API to orchestrate the cloud resources.

13. The network traffic management system of claim 12, wherein the one or more processors are further configured to be capable of executing the stored programmed instructions to characterize the monitored network traffic to identify a plurality of cloud resources required by the web service based on the metrics, wherein the one or more of the pricing profiles comprise pricing data for the cloud resources.

14. The network traffic management system of claim 11, wherein one or more of the pricing profiles comprise dynamic web pricing data for one or more cloud resources.

15. The network traffic management system of claim 11, wherein the one or more processors are further configured to be capable of executing the stored programmed instructions to direct at least a portion of the computing-traffic that is from a client of both a first cloud provider and a second cloud provider to either a first one of the cloud provider networks hosted by the first cloud provider or a second one of the cloud provider networks hosted by the second cloud provider based on the load balancing decision.

16. A method for load balancing implemented by a network traffic management system comprising at least one network traffic apparatus, client device, or server device, the method comprising:

utilizing a plurality of application programming interfaces (APIs) exposed by a plurality of cloud provider networks to obtain a plurality of pricing profiles, wherein each of the pricing profiles is associated with one of the cloud provider networks;

monitoring network traffic associated with at least one web service to determine one or more metrics associated with the web service;

determining a load balancing decision based on a correlation of one or more of the pricing profiles associated with the cloud provider networks with at least a subset of the determined metrics associated with the web service; and executing the determined load balancing decision on computing-traffic associated with the web service to direct the computing-traffic to one or more server instances hosted by at least one of the cloud provider networks.

17. The method of claim 16, wherein one or more of the pricing profiles comprise dynamic web pricing data for one or more cloud resources.

18. The method of claim 16, further comprising directing at least a portion of the computing-traffic that is from a client of both a first cloud provider and a second cloud provider to either a first one of the cloud provider networks hosted by the first cloud provider or a second one of the cloud provider networks hosted by the second cloud provider based on the load balancing decision.

19. The method of claim 16, further comprising:

orchestrating, via a first orchestrator located in a cloud, a load balancer comprising a hybrid-cloud load balancer and, via the hybrid-cloud load balancer acting as a second orchestrator, a plurality of cloud resources; and utilizing at least one of a number of connections per node or a response time for spawning one or more nodes on demand in the cloud through a cloud resource management API to orchestrate the cloud resources.

20. The method of claim 16, further comprising characterizing the monitored network traffic to identify a plurality of cloud resources required by the web service based on the metrics, wherein the one or more of the pricing profiles comprise pricing data for the cloud resources.

* * * * *